C. W. LAIR.
ICE SAWING MACHINE.
APPLICATION FILED MAY 4, 1914.
1,175,456.
Patented Mar. 14, 1916.
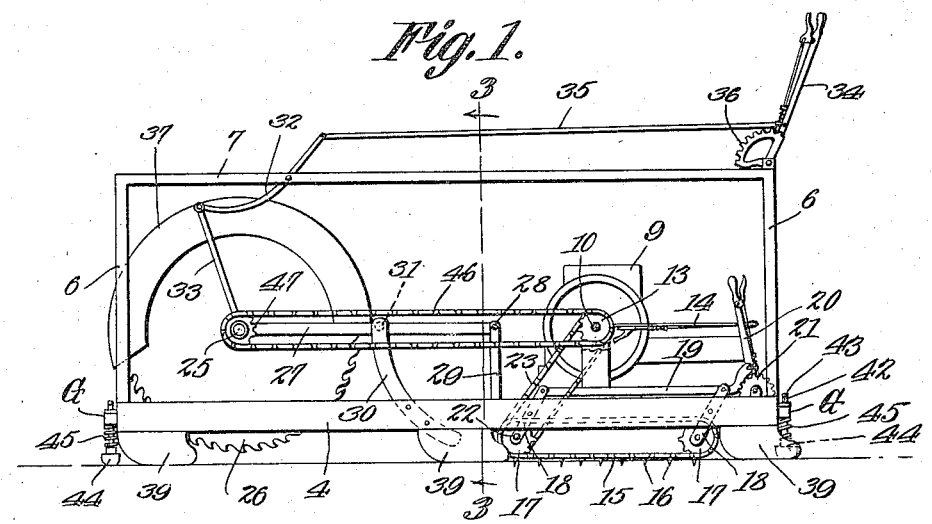
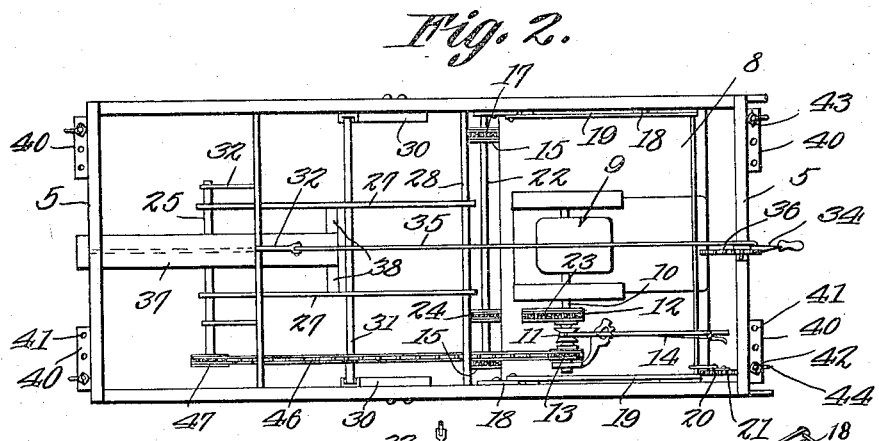
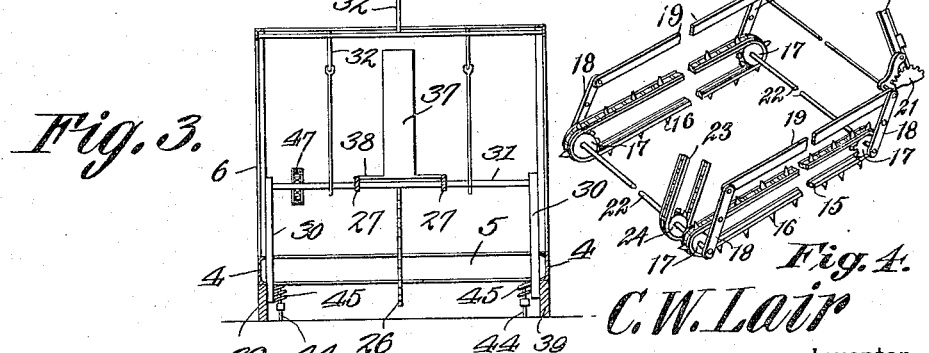
C. W. Lair
Inventor,
Witnesses
by
Attorneys.

UNITED STATES PATENT OFFICE.

CHARLES W. LAIR, OF BETHEL, MISSOURI.

ICE-SAWING MACHINE.

1,175,456.

Specification of Letters Patent.   Patented Mar. 14, 1916.

Application filed May 4, 1914.   Serial No. 836,331.

*To all whom it may concern:*

Be it known that I, CHARLES W. LAIR, a citizen of the United States, residing at Bethel, in the county of Shelby and State of Missouri, have invented a new and useful Ice-Sawing Machine, of which the following is a specification.

This invention relates to improvements in ice sawing machines.

The object of the present invention is to provide a novel creeper for propelling the machine over the ice.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The preferable embodiment of the invention is illustrated, in the accompanying drawing, wherein—

Figure 1 is a side elevation of the improved ice sawing machine, parts being broken away. Fig. 2 is a top plan view thereof. Fig. 3 is a cross sectional view taken on the line 3—3 of Fig. 1. Fig. 4 is a perspective view of the creeper.

The frame or body embodies a pair of channel iron side beams 4 to which are secured the end cross bars 5. Upright corner posts 6 are carried by the frame and support a top frame 7 which is similar to the lower frame 4—5, above referred to.

A platform 8 is carried by the rear portion of the body or lower frame 4—5 and supports the internal combustion engine 9. The engine includes the transverse drive shaft 10 having a sliding clutch member 11 thereon between a pair of sprocket wheels 12 and 13 which are loose upon the shaft to be engaged and driven by the clutch member. A shifting lever 14 carried above the platform 8 in any suitable manner engages the sliding clutch member 11 to enable it to be shifted into engagement with either of the said sprocket wheels and hold it so positioned. The creeper 15 is located below the platform and embodies a pair of endless tractor chains 15 whose links have spurs or teeth 16 adapted to engage the ice, and the chains are trained around a plurality of sprocket wheels 17 carried by cross shafts 22. Two pairs of levers 18 are fulcrumed to the side beams 4 of the frame, so as to be located at the opposite sides of the machine, and the levers 18 have lower and upper arms. Longitudinal links 19 connect the upper arms of the levers 18 of the respective pairs, and the cross shafts 22 are journaled through the lower arms of the opposite levers 18. Thus, the levers 18 in carrying the links 19 and shafts 22, will swing in unison, to enable the tractor chains 16 to be shifted upwardly and downwardly properly into and out of engagement with the ice.

The device for adjusting the creeper, embodies a hand lever 20 carried by the rear end portion of the frame, and linked to one of the links 19. The means for holding the hand lever 20 at various positions, includes a segment 21 with which a pawl or dog carried by the hand lever 20 is engageable, as is common for holding a hand lever in position. When the hand lever 20 is swung, it will reciprocate the corresponding link 19, and this will result in the levers 18 being swung or oscillated, for purpose of raising and lowering the creeper chains 16. In this manner, the chains 16 may be raised completely out of engagement with the ice, and may be lowered to various positions, for either lightly engaging the ice, or for slightly raising the frame to throw the weight thereof upon the creeper and to thereby increase the efficiency of the creeper.

A chain 23, which is operative either when tightened or slackened, extends around the sprocket wheel 12 on the engine shaft and around a sprocket wheel 24 on the forward shaft 22. Thus, when the clutch member 11 is thrown into engagement with the sprocket wheel 12, the creeper will be forcibly driven for the forward propulsion of the machine. A mandrel or shaft 25 carrying the circular saw 26 is journaled through the free ends of a pair of arms 27 which have their rear ends pivoted to a cross bar 28, supported by upstanding brackets 29 carried by the frame.

In order to prevent any side vibration or lateral movement of the saw and its carrier 25—27, curved and grooved guides 30 are rigidly secured to the side beams 4 and the grooves thereof receive the ends of a transverse rod 31 which is engaged through the arms 27. The guides 30 are curved about the axis of the pivot rod 28 as a center, and therefore do not interfere with the raising and lowering of the saw, but they do prevent any transverse vibration or movement thereof.

In order to raise and lower the saw so as to regulate the depth made by cut of the same, the a lever 32 carried by the fame 7 is connected to the saw mandrel by links 33. An actuating or hand lever 34 carried by the rear end of the frame 7 is connected to the lever 32 by the link 35. The lever 34 has means for engaging a rack 36 carried by the frame 7 so that the lever 34 may be held in adjusted position, thus locking the saw at a predetermined height. A guard 37 is disposed over the upper portion of the saw and is carried by the arms 27 to which it is secured by the holding members 38. Thus, the operator who is positioned at the rear of the machine will be protected from flying ice. The guard 37 will also prevent a person from falling against the saw.

Attached to the side beams 4 are runners 39 which slidably mount the machine upon the ice. In order that the distance between the incisions in the ice may be adjusted and will be uniform, carrier guides G are provided at the front and rear ends of the lower frame and each includes the apertured plate 40 attached to the frame, through the apertures 41 of which adjustable upright rods 42 are slidable, whereby the said rods may be moved toward or away from the longitudinal center of the machine. The rods 42 have nuts 43 threaded upon their upper ends to prevent the rods 42 from being lost. The lower extremities of the rods 42 are provided with shoes 44 which are adapted to project and run within the incision last cut in the ice, and to thereby guide the machine properly as it is propelled forwardly. A coiled spring 45 is carried by each rod 42, between the accompanying plate 41 and shoe 44, to thereby force the shoe down within the incision, or to allow the shoe to ride upon the surface of the ice when necessary.

Having thus fully described my invention, what I claim as new is:—

In a machine of the character described, a frame, two pairs of levers fulcrumed to the frame at its opposite sides and having lower and upper arms, longitudinal links connecting the upper arms of the levers of the respective pairs, cross shafts journaled through the lower arms of the opposite levers, a plurality of sprocket wheels carried by each of the said shafts, a plurality of endless tractor chains trained around the sprocket wheels of the said shafts, a hand lever carried by the frame and connected to one of the said links, means for holding the hand lever at various positions, an actuating mechanism carried by the frame and carrying a sprocket wheel, a sprocket wheel secured upon one of the said shafts, and a driving chain trained around the two last mentioned sprocket wheels.

In testimony that I claim the foregoing as my own, I have hereto affixed my signature in the presence of two witnesses.

CHARLES W. LAIR.

Witnesses:
   BERT WIGGINS,
   A. W. STEINBACH.

Copies of this patent may be obtained for five cents each, by addressing the "Commissioner of Patents, Washington, D. C."